(12) United States Patent
Karmi (10) Patent No.: US 7,885,618 B1
(45) Date of Patent: Feb. 8, 2011

(54) GENERATING CALIBRATION DATA FOR A TRANSMIT DIVERSITY COMMUNICATION DEVICE

(75) Inventor: Yair Karmi, Bridgewater, NJ (US)

(73) Assignee: Magnolia Broadband Inc., Warren, NJ (US)

( * ) Notice: Subject to any disclaimer, the term of this patent is extended or adjusted under 35 U.S.C. 154(b) by 1003 days.

(21) Appl. No.: 11/424,257

(22) Filed: Jun. 15, 2006

Related U.S. Application Data (60) Provisional application No. 60/713,976, filed on Sep. 2, 2005.

(51) Int. Cl.
*H03C 7/02* (2006.01)

(52) U.S. Cl. ............ 455/101; 455/63.1; 455/66.1; 455/67.11; 455/116

(58) Field of Classification Search ............ 455/61, 455/63.1, 66.1, 67.11, 67.14, 101, 102, 116, 455/124, 126
See application file for complete search history.

(56) References Cited

U.S. PATENT DOCUMENTS

| | | |
|---|---|---|
| 5,546,090 A | 8/1996 | Roy et al. |
| 5,642,353 A | 6/1997 | Roy, III et al. |
| 5,832,044 A | 11/1998 | Sousa et al. |
| 5,991,330 A | 11/1999 | Dahlman et al. |
| 5,999,826 A | 12/1999 | Whinnett |
| 6,185,440 B1 | 2/2001 | Barratt et al. |
| 6,226,509 B1 | 5/2001 | Mole et al. |
| 6,236,363 B1 | 5/2001 | Robbins et al. |
| 6,330,294 B1 | 12/2001 | Ansbro et al. |
| 6,343,218 B1 | 1/2002 | Kaneda et al. |
| 6,392,988 B1 | 5/2002 | Allpress et al. |
| 6,480,153 B1 | 11/2002 | Jung et al. |
| 6,492,942 B1 | 12/2002 | Kezys |
| 6,615,024 B1 | 9/2003 | Boros et al. |
| 6,636,495 B1 | 10/2003 | Tangemann |
| 6,690,952 B2 | 2/2004 | Nishimori et al. |
| 6,704,370 B1 | 3/2004 | Chheda et al. |
| 6,745,009 B2 | 6/2004 | Raghothaman |
| 6,762,717 B2 | 7/2004 | Hirabe |

(Continued)

FOREIGN PATENT DOCUMENTS

EP  0 986 193  3/2000

(Continued)

OTHER PUBLICATIONS

Strickler, Walt, "*Saving Time and Money on Mobile Phone Production Testing*", Keithley Instruments, Inc., No. 2536, www.keithley.com, 2 pages, Jul. 2004.

(Continued)

*Primary Examiner*—Yuwen Pan
(74) *Attorney, Agent, or Firm*—Pearl Cohen Zedek Latzer, LLP (57) ABSTRACT

Collecting calibration data includes receiving signals, where each signal is transmitted from a channel of a plurality of channels of a transmit diversity device. The signals are generated according to command points, where a command point comprises command parameter values of command parameters. A signal feature value is determined for each command point to yield a plurality of signal feature values. At least one signal feature value is associated with a command point that substantially yields the signal feature value.

31 Claims, 4 Drawing Sheets

U.S. PATENT DOCUMENTS

| | | | |
|---|---|---|---|
| 6,810,264 B1 | 10/2004 | Park et al. | |
| 6,859,643 B1 | 2/2005 | Ma et al. | |
| 6,882,228 B2 | 4/2005 | Rofougaran | |
| 6,917,786 B1 | 7/2005 | Mizuguchi | |
| 7,010,281 B2 | 3/2006 | Ukena et al. | 342/81 |
| 7,027,523 B2 | 4/2006 | Jalali et al. | |
| 7,031,669 B2 | 4/2006 | Vaidyanathan et al. | 455/103 |
| 7,197,282 B2 * | 3/2007 | Dent et al. | 455/67.14 |
| 7,200,368 B1 | 4/2007 | Hottinen et al. | |
| 7,340,248 B2 | 3/2008 | Kawasaki et al. | |
| 7,392,015 B1 | 6/2008 | Farlow et al. | |
| 2002/0111142 A1 | 8/2002 | Klimovitch | 455/63 |
| 2003/0112880 A1 | 6/2003 | Walton et al. | |
| 2005/0009483 A1 | 1/2005 | Eilts et al. | 455/136 |
| 2005/0059355 A1 | 3/2005 | Liu | |
| 2005/0117660 A1 * | 6/2005 | Vialle et al. | 375/299 |
| 2005/0143113 A1 | 6/2005 | Lee et al. | |
| 2005/1013059 | 6/2005 | Shurvinton et al. | 455/67.11 |
| 2006/0160496 A1 * | 7/2006 | Murakami et al. | 455/102 |
| 2007/0189151 A1 * | 8/2007 | Pan et al. | 370/210 |

FOREIGN PATENT DOCUMENTS

| | | |
|---|---|---|
| EP | 1 282 242 | 2/2003 |
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |

OTHER PUBLICATIONS

"*Application Note 3434, RF Power Reduction for CDMA/W-CDMA Cellular Phones*," Maxim/Dallas, http://www.maxim-ic.com/appnotes.cfm/appnote_number/3434, 4 pages., Dec. 15, 2004.

"*NIMS: Networked Infomechanical Systems*", Center for Embedded Networking Sensing, http://research.cens.ucla.edu/portal/nims, 10 pages, Printed Nov. 14, 2005.

Brandle, George, "*New Testing Requirements for cdma2000 Mobile Phones*", Evaluation Engineering, http://www.evaluationengineering.com/archive/articles/0601wire.htm, 9 pages, Printed Nov. 14, 2005.

"*Model 2800 RF Power Analyzer*", Keithley Instruments, Inc., http://www.globalspec.com/FeaturedProducts/Detail/KeithleyInstruments/Model_2800_R, 3 pages, Printed Nov. 14, 2005.

U.S. Appl. No. 11/283,250, entitled "*Calibrating A Transmit Diversity Communication Device*," by Haim (nmi) Harel et al., 25 pages specification, claims, and abstract plus 1 sheet of formal drawings, Filed Nov. 18, 2005.

Derryberry et al., "Transmit Diversity in 3G CDMA Systems", Wideband Wireless Access Technologies to Broadband Internet, IEEE Communications Magazine, Apr. 2002, pp. 68-75.

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

Nishimori et al., Automatic Calibration Method Using Transmitting Signals of an Adaptive Array for TDD Systems, IEEE Transactions on Vehicular Technology, vol. 50, No. 6, Nov. 2001, pp. 1636-1640.

* cited by examiner

GENERATING CALIBRATION DATA FOR A TRANSMIT DIVERSITY COMMUNICATION DEVICE

RELATED APPLICATION

This application claims benefit under 35 U.S.C. §119(e) of U.S. Provisional Application Ser. No. 60/713,976, entitled "CALIBRATION OF UNITS IN TRANSMIT DIVERSITY SYSTEM," filed Sep. 2, 2005, by Yair (nmi) Karmi. This application is related to U.S. application Ser. No. 11/283,250, filed Nov. 18, 2005, by Haim (nmi) Harel, et al. and entitled "CALIBRATING A TRANSMIT DIVERSITY COMMUNICATION DEVICE".

TECHNICAL FIELD

This invention relates generally to the field of multi-channel communication and more specifically to generating calibration data for a transmit diversity communication device.

BACKGROUND

A transmit diversity communication device may have multiple antenna elements that transmit signals to communicate information. A receiving communication device extracts the information from the transmitted signals. Multiple antenna elements may enhance spectral efficiency, allowing for more users to be simultaneously served over a given frequency band. A transmit diversity communication device, however, typically needs to be calibrated. It is generally desirable to effectively calibrate a transmit diversity communication device.

SUMMARY OF THE DISCLOSURE

In accordance with the present invention, disadvantages and problems associated with previous techniques for generating calibration data may be reduced or eliminated.

According to one embodiment of the present invention, collecting calibration data includes receiving signals. Each signal is transmitted from a channel of a plurality of channels of a transmit diversity device. The signals are generated according to command points, where a command point comprises command parameter values of command parameters. A signal feature value is determined for each command point to yield a plurality of signal feature values. At least one signal feature value is associated with a command point that substantially yields the signal feature value.

According to one embodiment of the present invention, generating calibration data includes measuring signals to yield measured signal feature values of a signal feature. Each signal is transmitted from a channel of a plurality of channels of a transmit diversity device. The signals are generated according to command points, where a command point comprises command parameter values of command parameters. Target signal feature values are established. Calibration data is generated according to the measured signal feature values, where the calibration data associates a target signal feature value with a command point that substantially yields the target signal feature value.

According to one embodiment of the present invention, a calibrator for generating calibration data for a transmit diversity device includes an interface and a transmit diversity tester. The interface is operable to receive signals, where each signal is transmitted from a channel of a plurality of channels of a transmit diversity device. The signals are generated according to command points, where a command point comprises command parameter values of command parameters. The transmit diversity tester is operable to: determine a signal feature value of a signal feature for each command point; associate each signal feature value with a command point that substantially yields the signal feature value; and generate calibration data according to the associations.

Certain embodiments of the invention may provide one or more technical advantages. A technical advantage of one embodiment may be that a calibration process may be performed on a transmit diversity device to determine calibration data. The calibration data may be used to establish command parameter values that yield signals with specific signal feature values under actual operating conditions. A technical advantage of another embodiment may be that null values of the command parameters are established. The null values may be used to efficiently gather measurements of a signal feature of signals generated according to the command parameter values. A technical advantage of another embodiment may be that calibration data may be efficiently generated from the measurements of the signal feature.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 9 of the drawings, like numerals being used for like and corresponding parts of the various drawings.

Figure 1:
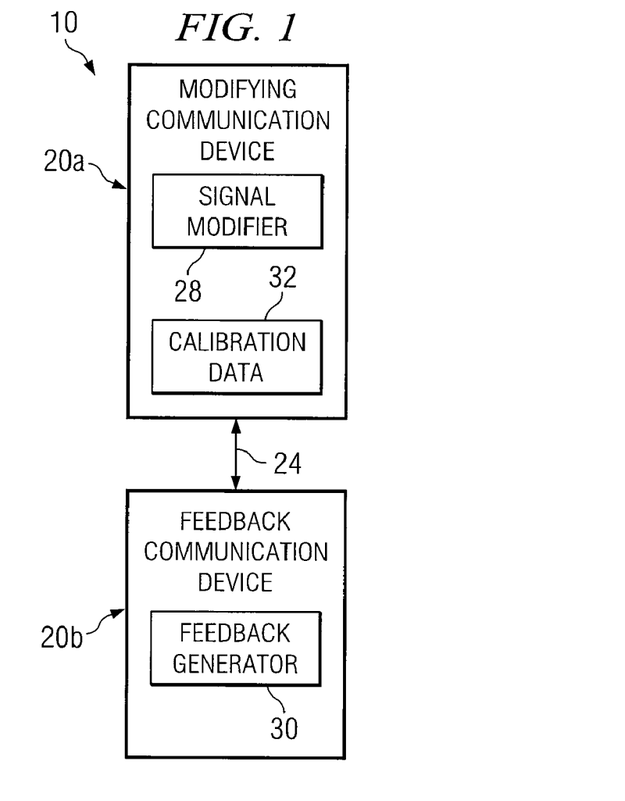
FIG. 1 is a block diagram illustrating one embodiment of a communication network that includes a modifying communication device that may be calibrated according to a calibration process.

FIG. 1 is a block diagram illustrating one embodiment of a communication network 10 that includes a modifying communication device 20a that may be calibrated according to a calibration process. According to the embodiment, modifying communication device 20a applies a diversity parameter adjustment to signals, and transmits the signals to feedback communication device 20b. Modifying communication device 20a determines a next diversity parameter adjustment in accordance with feedback information that describes the signals as received by feedback communication device 20b. According to the embodiment, a calibration system may perform a calibration process to establish calibration data that may be used to calibrate modifying communication device 20a.

According to the illustrated embodiment, network 10 operates to provide services such as communication sessions. A communication session may refer to an active communication between endpoints, measured from endpoint to endpoint. Information is communicated during a communication session. Information may refer to voice, data, text, audio, video, multimedia, control, signaling, other information, or any combination of the preceding.

The information may be communicated in packets. A packet may comprise a bundle of data organized in a specific way for transmission, and a frame may comprise the payload of one or more packets organized in a specific way for transmission. A packet-based communication protocol such as the Internet Protocol (IP) may be used to communicate the packets. A packet may comprise any suitable packet, such as a General Packet Radio Service (GPRS) packet, an Enhanced Data for GSM Evolutions (EDGE) packet, or other suitable packet.

Network 10 may utilize communication protocols and technologies to provide the communication sessions. Example communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

Devices of network 10 may use any suitable multiple access technology, for example, a code division multiple access (CDMA) technology. According to one embodiment, network 10 may operate according to a CDMA 2000 telecommunications technology that uses a single CDMA channel. As an example, a CDMA 2000 high rate data packet technology, such as the Evolution Data Only (EvDO) technology may be used.

Network 10 may comprise any suitable communication network. A communication network may comprise all or a portion of a public switched telephone network (PSTN), a public or private data network, a local area network (LAN), a metropolitan area network (MAN), a wide area network (WAN), a wireline or wireless network, a local, regional, or global communication network (such as the Internet), an enterprise intranet, other suitable communication link, or any combination of the preceding.

Network 10 includes one or more modifying communication devices 20a and one or more feedback communication devices 20b that communicate via a link 24. A communication device 20 represents any device operable to communicate information via signals with one or more other communication devices 20. For example, communication device 20 may comprise a subscriber unit or a base station. A subscriber unit may comprise any device operable to communicate with a base station, for example, a personal digital assistant, a cellular telephone, a mobile handset, a computer, or any other device suitable for communicating signals to and from a base station. A subscriber unit may support, for example, Session Initiation Protocol (SIP) or any other suitable communication protocol. A base station provides a subscriber unit access to a communication network that allows the subscriber unit to communicate with other networks or devices. Link 24 between communication devices 20a and 20b may include any suitable path operable to communicate one or more channels of signals. Link 24 may comprise a wireless radio frequency (RF) link or a wired link.

Modifying communication device 20a may comprise a transmit diversity communication device. A transmit diversity communication device may include one or more antenna elements associated with one or more channels. An antenna element is operable to receive, transmit, or both receive and transmit a signal over a channel. Multiple antenna elements may provide for a separation process known as spatial diversity. Typically, at least two channels are simultaneously active in at least one mode of operation.

Modifying communication device 20a includes a signal modifier 28 that modifies one or more signals in accordance with feedback information received from feedback communication device 20b. The modification may increase constructive interference or reduce destructive interference. According to one embodiment, signal modifier 28 may modify baseband signals prior to conversion to RF signals. According to another embodiment, signal modifier 28 may modify RF signals after conversion from baseband signals.

According to one embodiment, signal modifier 28 modifies signals according to values of one or more command parameters to yield the signals having values of one or more signal features. A command parameter may refer to a parameter for a command for modulating signals prior to transmission, and a signal feature may refer to a feature of the signals transmitted after modulation, such as when received by feedback communication device 20b. According to the embodiment, a change in one or more command parameter values yields a change in one or more signal features. A command parameter may have any suitable command parameter value. As an example, a command parameter $C_i$ of a set of command parameters $\{C_1, \ldots, C_n\}$, n=1, 2, 3, . . . , may have a value $c_{ij}$ of a set of command parameter values $\{c_{i1}, \ldots, c_{im}\}$, m=1, 2, 3, . . . . Instructions for modifying a signal may be expressed as one or more command parameter values of one or more command parameters. As an example, instructions may be given by a command vector, or command point, $<c_{1p}, \ldots, c_{nq}>$ comprising command parameter values of command parameters $<C_1, \ldots, C_n>$.

According to one embodiment, an I-parameter may refer to a weight for modifying an I-branch signal, and a Q-parameter may refer to a weight for modifying a Q-branch signal. The value of an I-parameter may be given by an I-value, and the value of a Q-parameter may be given by a Q-value. According to the embodiment, a signal modifier may modify an I-branch signal according to an I-value I, and may modify a Q-branch signal according to a Q-value Q. Instructions may be given by a command point <I, Q>. Signals from the branches are summed to yield a combined modified signal. According to one embodiment, the I-branch and the Q-branch signals may be orthogonal, but are typically not exactly orthogonal.

A signal feature may have any suitable signal feature value, which may represent the measured value of the signal feature. As an example, a signal feature $S_i$ of a set of signal features $\{S_1, \ldots, S_n\}$, n=1, 2, 3, . . . , may have a value $s_{ij}$ of a set of signal feature values $\{s_{i1}, \ldots, s_{im}\}$, m=1, 2, 3, . . . . Measurements of one or more signal features $<S_1, \ldots, S_n>$ may be expressed as a signal feature vector, or signal feature point, $<s_{1p}, \ldots, s_{nq}>$ of one or more signal feature values.

Signal features may include absolute or relative signal features. Absolute signal features describe a signal with respect to an independent measure, and may include, for example, phase, amplitude, power, frequency, timing, other suitable signal feature, or any combination of the preceding. For example, an absolute signal feature may describe the total power transmitted by modifying communication device 20a.

Relative signal features describe a first signal from a first channel with respect to a second signal from a second channel. A relative signal feature among channels may be determined from absolute signal features of the channels. Relative signal features may include, for example, relative power or relative phase. Relative power may refer to a power ratio between the power of the first signal and the power of the second signal, and may be expressed in decibels by the following equation:

$$R_{12} [db] = 10 * \log 10(|P_1/P_2|)$$

where $R_{12}$ represents the power ratio, $P_1$ represents the power of the first signal, and $P_2$ represents the power of the second signal.

Relative phase may refer to the phase difference between the phase of the first signal and the phase of the second signal, and may be expressed by the following equation:

$$\Delta\Phi = \Phi_1 - \Phi_2$$

where $\Delta\Phi$ represents the phase difference, $\Phi_1$ represents the phase of the first signal, and $\Phi_1$ represents the phase of the second signal.

According to one embodiment, signal modifier 28 may calculate a diversity parameter adjustment from feedback information. According to the embodiment, the diversity parameter adjustment may be calculated from a previous diversity parameter adjustment and a diversity parameter increment, where the diversity parameter increment may be determined using feedback information obtained in any suitable manner. According to a first example, signal modifier 28 obtains feedback information from a quality indication signal received from feedback communication device 20b. A quality indication signal may refer to a signal that describes a quality of the signal as received by feedback communication device 20b. According to a second example, signal modifier 28 obtains feedback information from a control signal generated by a baseband subsystem of modifying communication device 20a. A control signal may refer to a signal that provides instructions to a component of a communication device. According to the embodiment, the baseband subsystem extracts feedback information from a quality indication signal from feedback communication device 20b, and generates a control signal that reflects the feedback information.

The operating conditions of modifying communication device 20a may affect the diversity parameter adjustment, which in turn may affect the signal feature values of the signals received at feedback communication device 20b. Operating conditions may refer to any aspect of operation of modification communication device 20a, and may be represented by values of condition parameters, such as temperature, channel frequency, other condition, or other suitable combination of the preceding.

Signal modifier 28 includes calibration data 32 that describes command parameter values that yield specific signal feature values, and may take into account the operating conditions of modifying communication device 20a. Calibration data 32 may include signal feature data that associates signal feature values with command parameter values that yield the signal feature values. The associations may take into account the operating conditions, and specific associations may be defined for specific conditions. Calibration data 32 may include adjustment data that specifies adjustments to command parameter values. The adjustments may take into account the operating conditions, and specific adjustments may be defined for specific conditions.

Calibration data 32 may be organized in any suitable manner. According to one embodiment, tables may be used to organize the data. For example, different tables may be used for different signal features, or different tables may be used for different operating conditions. Data from one or more tables may be used to calculate a diversity parameter adjustment, and data from multiple tables may be combined in any suitable manner for the calculation.

According to one embodiment, signal feature data may specify command parameter values for absolute transmit power and relative phase. Signal feature data may specify the channel power for each channel that yields a particular total transmit power. Channel power may refer to the power transmitted by an antenna element of a channel. The absolute transmit power may refer to the total power transmitted by the active antenna elements, and may be selected in accordance with an air interface standard, such as the Universal Mobile Telecommunications System (UMTS), Code Division Multiple Access 2000 (cdma2000), Worldwide Interoperability for Microwave Access (WiMAX), or Global System for Mobile Communications (GSM) standards. As an example, signal feature data may specify that the channel power for each channel is P/n, where P represents the absolute transmit power, and n represents the number of active channels.

According to the embodiment, signal feature data may specify command parameter values that yield certain particular phase difference values, given particular power ratio values. As an example, a table i for a power ratio value R(i) may provide command parameter values that yield phase difference values $\Delta\Phi(i,j)$, where $\Delta\Phi(i,j)$ ranges from 0 to 360 degrees. Different tables may include command parameter values for the same or different signal feature values. According to one embodiment, different tables may apply to different operating conditions, for example, different tables may apply for different frequencies and temperatures.

According to one embodiment, adjustment data may specify adjustments to account for power ratio changes in response to operating conditions. According to the embodiment, a temperature table specifies adjustments for temperature variations, and a frequency table specifies adjustments for frequency variations. Data from the tables may be combined in any suitable manner, for example, an adjustment from the temperature table may be added to an adjustment from the frequency table to yield an adjustment for the power ratio.

According to one embodiment of implementing the tables, a power ratio is determined from feedback information according to a diversity parameter technique. Adjustment data tables corresponding to the current operating conditions are used to determine an adjustment for the power ratio. The adjustment may be added to the power ratio to adjust the power ratio. A table for the power ratio value is used to establish command parameter values that yield a desired phase difference value.

According to one embodiment, calibration data may be applied even if error is introduced into the calibrated diversity adjustment. According to the embodiment, the calibrated diversity adjustment for point N is $\Delta\Phi(N)$, and the calibrated diversity adjustment for point N+1 is $\Delta\Phi(N+1)$. An error $\delta\Phi$ is introduced into the calibrated diversity adjustment, so the actual diversity adjustment for a point N is $\Delta\Phi(N)+\delta\Phi(N)$, and the calibrated diversity adjustment for a point N+1 is $\Delta\Phi(N+1)+\delta\Phi(N+1)$. Accordingly, the calibrated diversity adjustment from point N to N+1 is $\Delta\Phi(N+1)-\Delta\Phi(N)$, and the actual diversity adjustment from point N to N+1 is $\Delta\Phi(N+1)-\Delta\Phi(N)+\delta\Phi(N,N+1)$. If the error is sufficiently small, then the calibration data may be applied.

According to one embodiment, feedback communication device 20b includes a feedback generator 30 that generates feedback information that reflects the quality of the modified signals. The quality may be determined using any suitable measurements, for example, transmit gain, signal-to-noise ratio (SNR), bit error rate (BER), frame error rate (FER), other measurement, or any suitable combination of the preceding. Typically, a higher transmit gain, a higher signal-to-noise ratio, a lower bit error, or a lower frame error rate indicates higher signal quality. The feedback information may be sent to modifying communication device 20a in a quality indication signal.

A component of network 10 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Modifications, additions, or omissions may be made to communication network 10 without departing from the scope of the invention. Additionally, operations of communication network 10 may be performed using any suitable logic. As used in this document, "each" refers to each member of a set or each member of a subset of a set. A subset of a set may include none, some, or all elements of the set.

Figure 2:
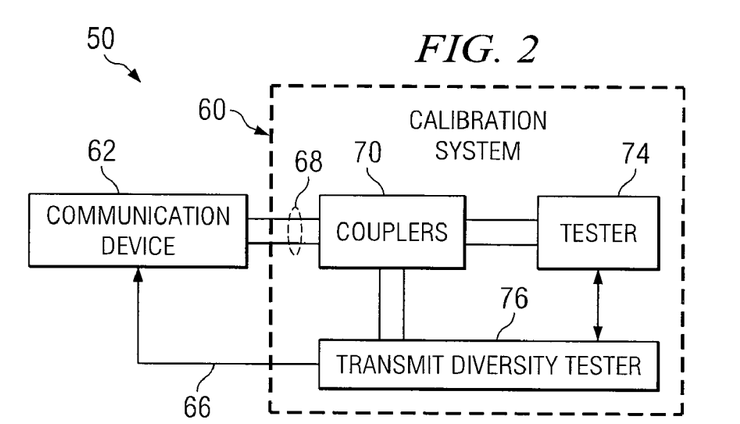
FIG. 2 is a block diagram illustrating one embodiment of a system that includes a calibration system operable to perform a calibration process.

FIG. 2 is a block diagram illustrating one embodiment of a system 50 that includes a calibration system 60 operable to perform a calibration process. According to the illustrated embodiment, calibration system 60 generates calibration data for communication device 62. System 50 includes calibration system 60 coupled to communication device 62 by a communication bus 66. According to one embodiment, communication device 62 may comprise a transmit diversity device. Communication device 62 transmits signals through a plurality of channels 68. A channel may comprise a wireless radio frequency (RF) channel or a wired channel.

According to one embodiment of operation, calibration system 60 performs a calibration process to generate calibration data for communication device 62. The calibration process may be performed online in real time or offline in batch mode. Calibration system 60 includes couplers 70, a tester 74, and a transmit diversity tester 76 coupled as shown. Couplers 70 may comprise RF couplers that send signals to tester 74 and divert a known portion of the signals, for example, −20 decibels (dB), to transmit diversity tester 76. Although couplers 70 are illustrated as within calibration system 60, one, some, or all couplers 70 may be external to calibration system 60. Moreover, wires may be connected directly to tester 74 without the use of couplers 70, or switches may be used to couple one or more inputs to tester 74.

Tester 74 measures absolute signal features. According to one embodiment, tester 74 may comprise a tester that tests non-transmit diversity devices, and may measure absolute transmit diversity power levels. The levels may be measured either by activating one output at a time, or by combining outputs after they have been properly matched using the measurements from transmit diversity tester 76.

Transmit diversity tester 76 performs a calibration process to generate calibration data for transmit diversity signal features. According to one embodiment, transmit diversity tester 76 sends commands to communication device 62 to instruct communication device 62 to transmit signals with specific controls. Transmit diversity tester 76 measures signal features of the signals transmitted by communication device 62. Transmit diversity tester 76 generates calibration data that describes command parameter values that yield specific signal feature values. Communication device 62 may use the calibration data to determine command parameter values that yield specific signal feature values. Transmit diversity tester 76 may perform the analysis according to any suitable method, for example, the method described with respect to FIGS. 7 and 8.

Tester 74 and transmit diversity tester 76 may operate in parallel or in sequence. If tester 74 and transmit diversity tester 76 may operate in sequence, transmit diversity tester 76 may use a modulated or an unmodulated sine wave (CW) signal for optimized measurement.

Communication bus 66 communicates information between transmit diversity tester 76 and communication device 62. Communication bus 66 may comprise any suitable communication link, for example, a wired interface such as a general purpose interface bus (GPIB), universal serial bus (USB), Ethernet interface, Recommended Standard 232C (RS 232) interface, or a wireless interface such as a Bluetooth interface.

A component of system 50 may include logic, an interface, memory, other component, or any suitable combination of the preceding that may be integrated or separated according to particular needs. If any of the components of system 50 are separated, the separated components may be coupled using a bus or other suitable link.

Modifications, additions, or omissions may be made to system 50 without departing from the scope of the invention. The components of system 50 may be integrated or separated according to particular needs. Moreover, the operations of system 50 may be performed by more, fewer, or other modules. Additionally, operations of calibration system 50 may be performed using any suitable logic.

Figure 3:
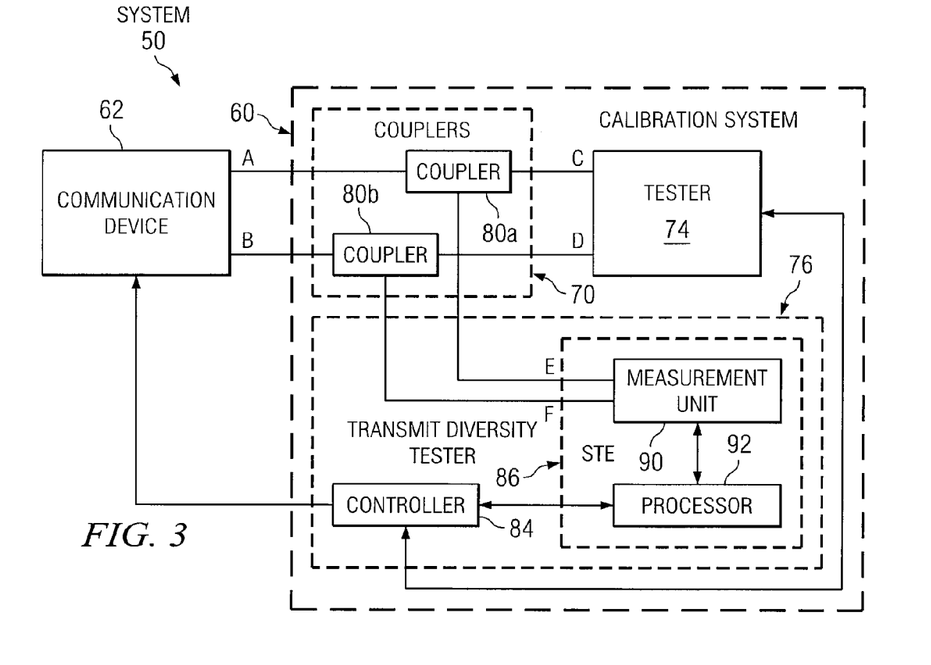
FIG. 3 is a block diagram illustrating an example embodiment of the system of FIG. 2.

FIG. 3 is a block diagram illustrating an example embodiment of system 50 of FIG. 2. According to the illustrated embodiment, system 50 includes communication device 62 and calibration system 60. Test points A and B represent test points of communication device 62 at which signals are measured. Test points A and B may be proximate to antenna ports of communication device 62.

Calibration system 60 includes couplers 70, tester 74, and transmit diversity tester 76 coupled as shown. Couplers 70 include couplers 80a-b. Tester 74 includes test points C and D at which signals are measured. Transmit diversity tester 76 includes a controller 84 and special test equipment (STE) 86. Controller 84 may coordinate the operation of the elements of calibration system 60, and may comprise a processing board or personal computer (PC).

Special test equipment 86 includes a signal feature measurement unit 90 and a processor 92. Signal feature measurement unit 90 measures relative signal features of signals received from couplers 80a-b, and may measure absolute signal features of the signals. Test points E and F represent the inputs to signal feature measurement unit 90 at which the diverted signals are measured. Processor 92 may control and acquire test data from signal feature measurement unit 90, perform initial processing, and communicate the results to controller 84. Processor 92 may comprise a standard, microprocessor-based data acquisition circuit board.

According to one embodiment, if special test equipment 86 is integrated into tester 74, test points C and D may be the same as test points E and F, or test points C and D may be internal to the integrated test unit, which may be coupled directly to ports of communication device 62, or test points C and D may be inside of couplers 70 and connected to an input of tester 74 through a switch.

Figure 4:
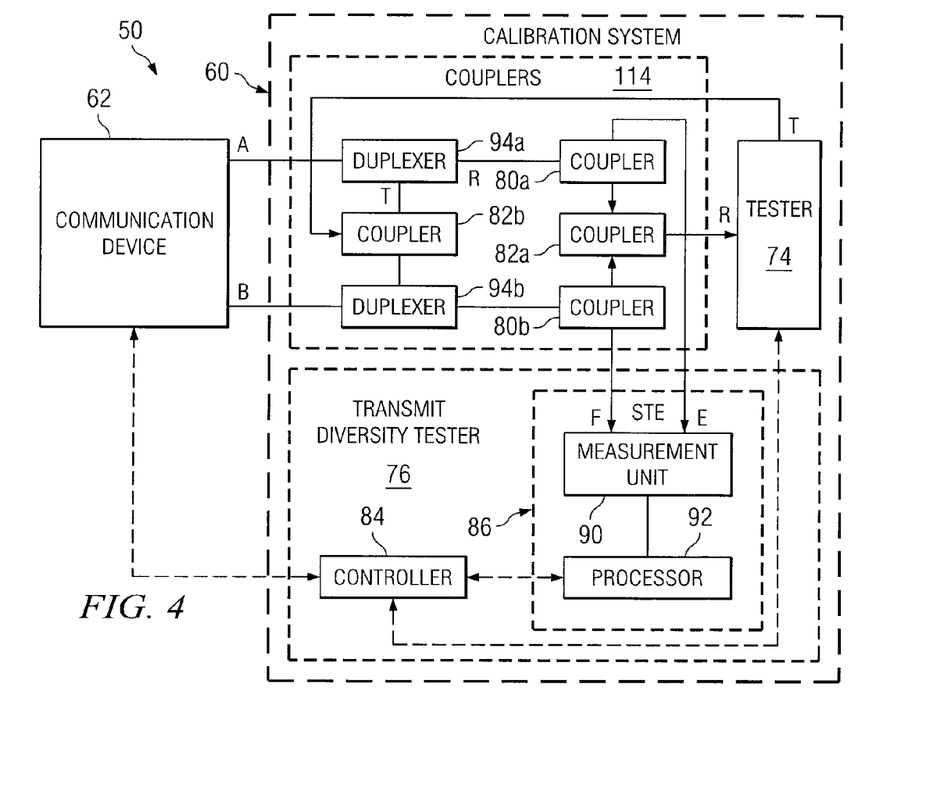
FIG. 4 is a block diagram illustrating an example embodiment of the system of FIG. 2.

FIG. 4 is a block diagram illustrating an example embodiment of system 50 of FIG. 2. The example embodiment may be used for tester 74 with separate transmit and receive ports. According to the illustrated embodiment, system 50 includes communication device 62 and calibration system 60. Calibration system 60 includes couplers 70, tester 74, and transmit diversity tester 76 coupled as shown.

Couplers 70 include duplexers 94a-b, couplers 80a-b, and couplers 82a-b. Duplexers 94a-b separate the transmit and receive channels of communication device 62. Couplers 80a-b provide path samples to special test equipment 86. Coupler 82a combines multiple channels to yield a single signal for tester 74, and coupler 82b splits a single signal from tester 74 into signals for the channels. Tester 74 may comprise a single channel test set, such as model number 8960 test set, manufactured by Agilent Technologies Inc. (Palo Alto, Calif.). Tester 74 may be coupled through a common transmit-receive port. Transmit diversity tester 76 includes controller 84 and special test equipment (STE) 86. Special test equipment 86 includes signal feature measurement unit 90 and processor 92.

Figure 5:
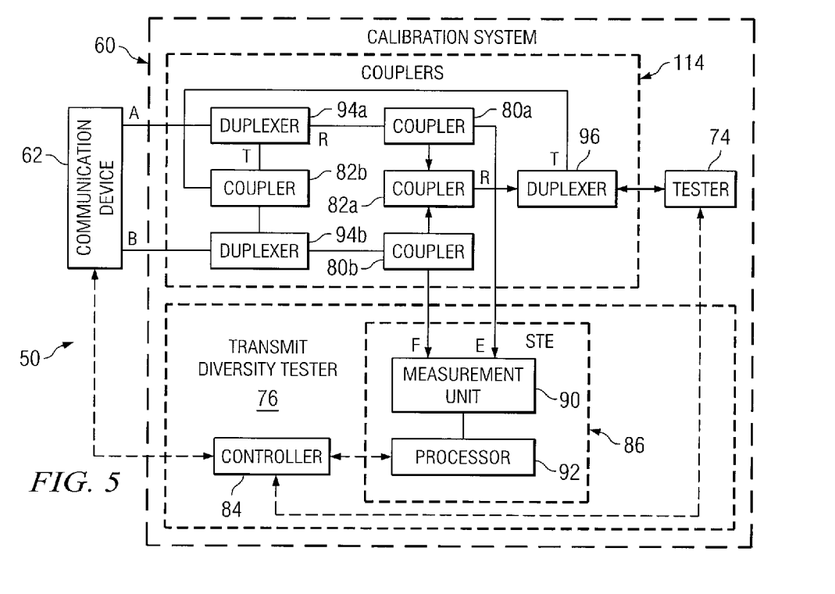
FIG. 5 is a block diagram illustrating an example embodiment of the system of FIG. 2.

FIG. 5 is a block diagram illustrating an example embodiment of system 50 of FIG. 2. The example embodiment may be used for tester 74 with a single channel. According to the illustrated embodiment, system 50 includes communication device 62 and calibration system 60. Calibration system 60 includes couplers 70, tester 74, and transmit diversity tester 76 coupled as shown. Couplers 70 include duplexers 94a-b, couplers 80a-b, couplers 82a-b, and duplexer 96. Duplexer 96 combines the receive and transmit channels to yield a single signal for tester 74. Transmit diversity tester 76 includes controller 84 and special test equipment (STE) 86. Special test equipment 86 includes signal feature measurement unit 90 and processor 92.

Figure 6:
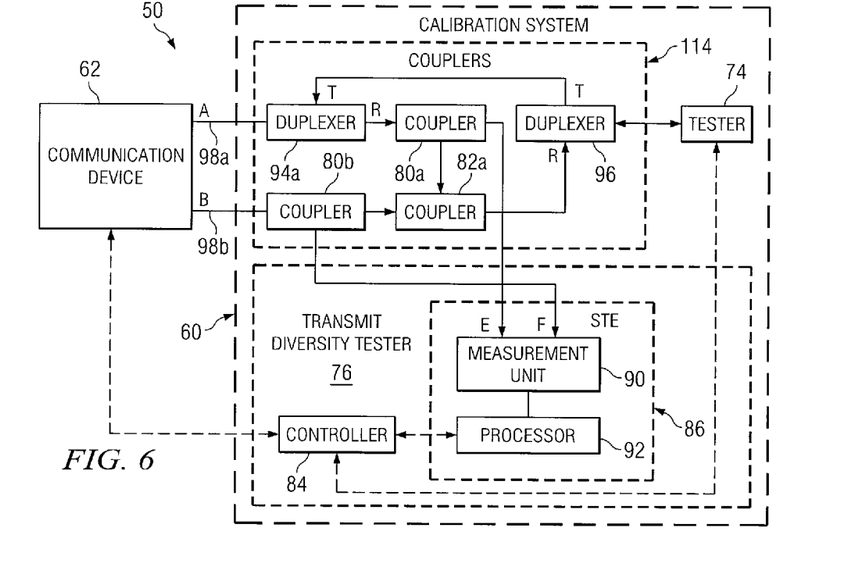
FIG. 6 is a block diagram illustrating an example embodiment of the system of FIG. 2.

FIG. 6 is a block diagram illustrating an example embodiment of system 50 of FIG. 2. The example embodiment may be used to calibrate communication device 62 that has no receive diversity. According to the illustrated embodiment, system 50 includes communication device 62 and calibration system 60. Communication device 62 has ports 98a-b, where port 98a is a transmit and receive port and port 98b is a transmit-only port. Port 98b is coupled directly to coupler 80b. Calibration system 60 includes couplers 70, tester 74, and transmit diversity tester 76 coupled as shown. Couplers 70 include duplexers 94a, couplers 80a-b, couplers 82a-b, and duplexer 96. Transmit diversity tester 76 includes controller 84 and special test equipment (STE) 86. Special test equipment 86 includes signal feature measurement unit 90 and processor 92.

Figure 7:
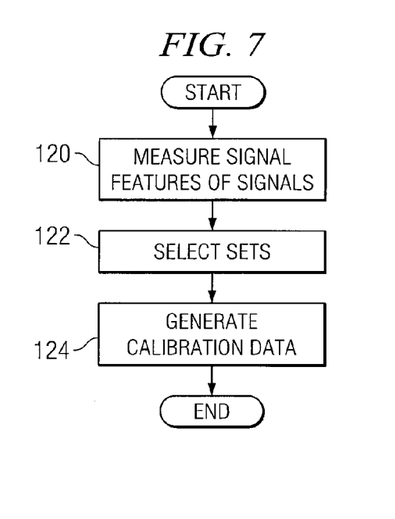
FIG. 7 is a flowchart illustrating one embodiment of a method for collecting calibration data for a communication device that may be used by the calibration system of FIG. 2.

FIG. 7 is a flowchart illustrating one embodiment of a method for collecting calibration data for communication device 62 that may be used by calibration system 60 of FIG. 2. Calibration data, such as calibration tables, map command parameter values to signal features. Example command parameter values include I-values and Q-values, and example signal features include phase difference $\Phi$ and power ratio A. Signals with particular signal features may be generated using the command parameter values mapped to the particular signal features. Accordingly, given one or more signal features, one or more command parameter values that may be used to generate signals with the signal features may be established using the calibration data. Additional processing, such as interpolation, may be used to establish the command parameter values.

According to the embodiment, command parameter values are used to generate signals. Signal features of the signals are measured to establish the command parameter values that should be mapped to the signal features. Some or all of the mappings are stored in the calibration data.

According to the illustrated embodiment, the method starts at step 120, where signal features of signals generated according to command parameter values are measured. For example, signal features $<\Phi,A>$ of signals generated according to command parameter values $<I, Q>$ may be measured. Command parameters may be applied in any suitable manner. According to one embodiment, given include I-values and Q-values, some or all combinations of values may be applied.

As an example, an exhaustive search may be performed. According to the example, a vector d(k,m) includes an I variable that assumes a value k and a Q variable that assumes a value m:

$$\bar{d}(k,m)=\bar{d}[I(k),Q(m)]$$

Vector d(k,m) has an amplitude A(k,m) that corresponds to the amplitude ratio between one output and a reference output, and a phase $\Phi(k,m)$ that corresponds to the phase difference between the output and the reference output:

$$\bar{d}(k,m)=A(k,m)\angle\Phi(k,m)$$

According to the exhaustive search technique, control combinations (k,m) are scanned, and the output vectors $\bar{d}(k,m)=\bar{d}[I(k),Q(m)]$ are measured. The measurements are scanned to identify the control combinations (k,m) that yield specific calibration outputs.

According to another embodiment, only selected combinations of values may be applied. For example, every kth value may be applied to decrease the applied values by 1/k. An example embodiment is described with reference to FIG. 8.

Sets of signal features are selected at step 122. For example, signal features $<\Phi,A>$ that may be seen as optimizing may be selected. Calibration data is generated at step 124 by mapping the selected signal features to command parameter values that yield signals with the signal features. For example, signal features $<\Phi,A>$ may be mapped to command parameter values $<I, Q>$ that yield the signal features $<\Phi,A>$. The mappings may be indexed by the signal features $<\Phi,A>$. The method then terminates.

Modifications, additions, or omissions may be made to the method without departing from the scope of the invention. The method may include more, fewer, or other steps. Additionally, steps may be performed in any suitable order without departing from the scope of the invention.

Figure 8:
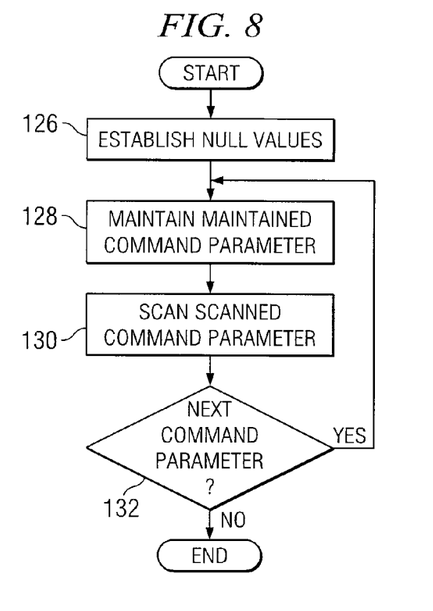
FIG. 8 is a flowchart illustrating one embodiment of a method for applying command parameter values that may be used with the method of FIG. 7.

FIG. 8 is a flowchart illustrating one embodiment of a method for applying command parameter values that may be used with the method of FIG. 7, based on first determining the null values of the command parameters.

In an ideal vector modulator, the I- and Q-branches are perpendicular, that is:

$$\bar{d}(k,0)\times\bar{d}(0,m)=0 \; \forall k,m$$

In existing vector modulators, this is not always the case. Assuming the minimum output power from each branch is sufficiently close to zero, the following holds for the general case:

$$\bar{d}(k,m) = \bar{d}(k, Q_{null}) + \bar{d}(I_{null}, m)$$

The separate sweep of the I-branch with $Q=Q_{null}$ and Q-branch with $I=I_{null}$, yields:

$$I(k)_{Qnull}: \bar{d}(k,m) = \bar{d}[(k)Q(m)_{null}]\{A(k,Q_{null}), \Phi(k,Q_{null})\}$$

$$I(k)_{Qnull}: \bar{d}(k,Q_{null}) = A(k,Q_{null}) \angle \Phi(k,Q_{null})$$

$$Q(m)_{Qnull}: \bar{d}(I_{null}, m) = A(I_{null}, m) \angle \Phi(I_{null}, m)$$

Accordingly, vector d(k,m) for any k,m may be expressed as follows:

$$\bar{d}(k,m) = \bar{d}(k, \text{null}\_Q) + \bar{d}(\text{null}\_I, m)$$

Null values for the command parameters are established at step 126. A null value of a command parameter represents a command parameter value at which a signal feature is at a minimum for the command parameter. For example, a null I-value $I_{null}$ represents the value at which the transmit power from the I-branch is at a minimum, and a null Q-value $Q_{null}$ represents the value at which the transmit power from the Q-branch is at a minimum.

Steps 128 and 130 describe scanning through command parameter values and measuring the signal features resulting from the command parameter values. A value of a maintained command parameter is maintained at a null value at step 128. For example, the I-value may be maintained at null value $I_{null}$. The values of a scanned command parameter are varied at step 130. For example, the Q-value may be varied.

There may be a next command parameter for which a null value is to be established at step 132. For example, Q-value may be maintained at null value $Q_{null}$, and the I-value may be varied. If there is a next command parameter, the method returns to step 128. If there is no next command parameter, the method terminates.

Modifications, additions, or omissions may be made to the method without departing from the scope of the invention. The method may include more, fewer, or other steps. Additionally, steps may be performed in any suitable order without departing from the scope of the invention.

Figure 9:
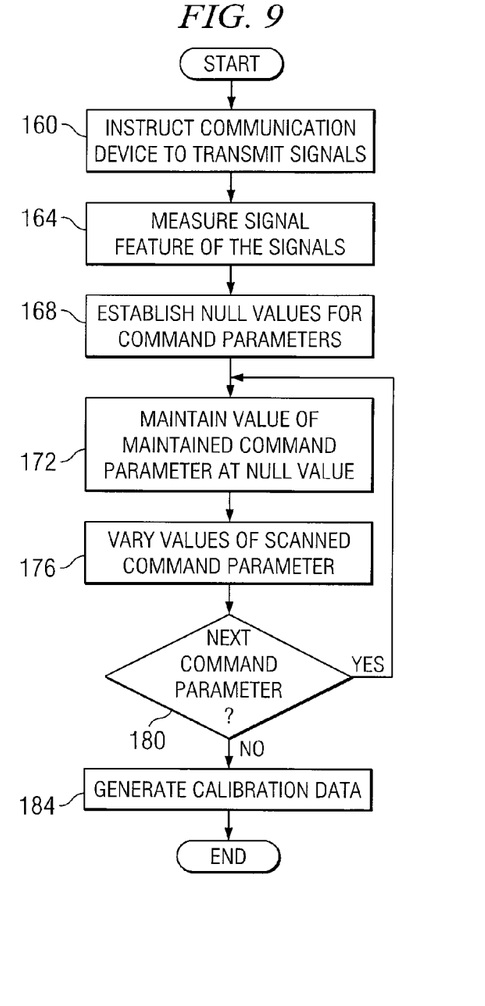
FIG. 9 is a flowchart illustrating one embodiment of a method for collecting calibration data for a communication device that may be used by the calibration system of FIG. 2.

FIG. 9 is a flowchart illustrating one embodiment of a method for collecting calibration data for communication device 62 that may be used by calibration system 60 of FIG. 2. According to the embodiment, null values for command parameters are established from measurements of signals from communication device 62. A value for a maintained command parameter is maintained at a null value, while the values for a scanned command parameter are varied. Measurements are performed to determine the command parameter values that yield specific signal feature values. Although this embodiment is described using null values, any suitable constant values may be used.

According to the illustrated embodiment, the method starts at step 160, where calibration system 60 instructs communication device 62 to send signals. The instructions may specify, for example, command parameter values such as I-values and Q-values, and may be expressed as command points <I, Q>. The instructions may be provided to communication device 62 at the initial stage or throughout the method. As an example, instructions may be provided as a program executed by communication device 62. As another example, instructions may be continually provided by calibration system 60 to communication device 62.

Signal features of the signals generated according to the instructions are measured at step 164. Any suitable signal features may be measured, for example, absolute and relative signal features. The signals may be measured in any suitable manner throughout the method. As an example, communication device 62 transitions power from low power to high power when sending a signal. Signal feature measurement unit 90 detects the transition and initiates measurement. As another example, communication device 62 provides a synchronization signal to indicate the start of the measurement. Signal feature measurement unit 90 detects the synchronization signal and initiates measurement. As another example, communication device 62 may be instructed to transmit signals at specific intervals, and signal feature measurement unit 90 may measure the signals at the intervals. As another example, controller 84 synchronizes the signal transmission from communication device 62 and the measurement by signal feature measurement unit 90.

Null values for the command parameters are established at step 168. A null value of a command parameter represents a command parameter value at which a signal feature is at a minimum for the command parameter. For example, a null I-value $I_{null}$ represents the value at which the transmit power from the I-branch is at a minimum, and a null Q-value $Q_{null}$ represents the value at which the transmit power from the Q-branch is at a minimum. A null point $P_{null}$ may refer to the point at which all the values are null, and may be expressed as $<I_{null}, Q_{null}>$.

The null values may be established according to any suitable embodiment or combination of embodiments. According to one embodiment, a signal feature of signals resulting from the points of a set of candidate null points may be measured, and the point that yields the minimum signal feature value may be designated as the null point. The set of candidate null points may be determined from an estimate of the minimum and maximum command parameter values that could yield null values. For example, a minimum candidate I-value $I_{min}$ and a maximum candidate I-value $I_{max}$ represent estimated minimum and maximum I-values, respectively, that could yield the null I-value, and a minimum candidate Q-value $Q_{min}$ and a maximum candidate Q-value $Q_{max}$ represent estimated minimum and maximum Q-values, respectively, that could yield the null Q-value. The set of candidate null points may be expressed as $\{<I, Q>: I_{min}<I<I_{max}, Q_{min}<Q<Q_{max}\}$.

According to another embodiment, a value of a maintained command parameter may be maintained at a nominal value, while the values of a scanned command parameter are varied, and the value of the scanned command parameter that yields a minimum signal feature value may be designated as the null value of the scanned command parameter. Then, a value of a next maintained command parameter may be maintained at a nominal value, while the values of a next scanned command parameter are varied. For example, the set $\{<I, Q>: I=I_{nom}, Q_{min}<Q<Q_{max}\}$, where $I_{nom}$ represents a nominal I-value, may be scanned to establish the null Q-value. Then, the set $\{<I, Q>: I_{min}<I<I_{max}, Q=Q_{nom}\}$, where $Q_{nom}$ represents a nominal Q-value, may be scanned to establish the null I-value. The process may be repeated for any suitable number of iterations. The nominal value may refer to an estimate of a null value, and may be estimated from a previous iteration of the process. For example, $I_{nom}$ may be $I_{null}$ from a previous iteration.

The values of a scanned command parameter may be varied in any suitable manner. According to one embodiment, the values of a scanned command parameter may be varied starting from the maximum candidate value of the scanned command parameter and varying the values in the direction of the minimum candidate value. For example, the I-value is held at $I_{nom}$, while the Q-value is varied starting from $Q_{max}$. Then, the Q-value is held at $Q_{nom}$, while the I-value is varied starting from $I_{max}$. Starting at the maximum candidate value and varying the values in the direction of the minimum candidate value generally yields signal feature values that decrease until a null point is reached. Accordingly, the null point may be identified as the point at which the signal feature values cease to decrease.

According to another embodiment, the values of a scanned command parameter may be varied according to a gradient search. For example, the I-value is held at $I_{nom}$, while the Q-value is varied according to a gradient search. Then, the Q-value is held at $Q_{nom}$, while the I-value is varied according to a gradient search. According to a gradient search, a current test value may be selected by moving in a direction, for example positive or negative, from a previous test value. If the current test value yields a desired measurement, then a next test value is selected by moving in the same direction. If the current test value does not yield a desired measurement, then the next test value is selected by moving in the another direction, for example, the opposite direction.

Steps 172 and 176 describe scanning through command parameter values and measuring the signal features resulting from the command parameter values. The command parameter values may be selected from a set of candidate command parameter values. The set of candidate command parameter values may be established in any suitable manner. For example, the set may be established from the history of communication devices similar to communication device 62.

A value of a maintained command parameter is maintained at a null value at step 172. For example, the I-value may be maintained at null value $I_{null}$. The values of a scanned command parameter are varied to establish a null value for the scanned command parameter at step 176. For example, a Q-value may be varied to establish null value $Q_{null}$. The values may be varied according to any suitable embodiment or combination of embodiments. One, some, or all of the scanned command parameter values may be sequentially scanned within the set of candidate command parameter values.

According to one embodiment, a subset of the set of candidate command parameter values may be scanned, and then measurements for unscanned values may be determined from measurements for the scanned values. As an example, every nth command parameter value may be sequentially scanned, where n may be any suitable number. Measurements for unscanned values may be determined from the measurements for the scanned values in any suitable manner, for example, by interpolation using a continuity function such as a polynomial approximation.

As another example, the scanned values may be selected to be symmetric to unscanned values such that measurements of the unscanned values may be determined from the measurements of the scanned values. For example, the set of candidate scanned command parameter values may be divided into quadrants according to TABLE 1:

TABLE 1

| Quadrant/Value | I value | Q value | I-range | Q-range |
|---|---|---|---|---|
| 1: $\Phi = $ 0-90° | $I_I$ | $Q_I$ | $I_{null} - I_{max}$ | $Q_{null} - Q_{max}$ |
| 2: $\Phi = $ 90-180° | $2 * I_{null} - I_{I180-\Phi}$ | $Q_{I180-\Phi}$ | $I_{min} - I_{null}$ | $Q_{null} - Q_{max}$ |
| 3: $\Phi = $ 180-270° | $2 * I_{null} - I_{I\Phi-180}$ | $2 * Q_{null} - Q_{I\Phi-180}$ | $I_{min} - I_{null}$ | $Q_{min} - Q_{null}$ |
| 4: $\Phi = $ 270-360° | $I_I$ | $2 * Q_{null} - Q_{I360-\Phi}$ | $I_{null} - I_{max}$ | $Q_{min} - Q_{null}$ |

According to the example, the values of one quadrant, for example, Quadrant 1, may be scanned. Measurements of the other quadrants, for example, Quadrants 2 through 4, may be determined from the measurements of the scanned quadrant.

There may be a next command parameter for which a null value is to be established at step 180. For example, a null I-value may be established. If there is a next command parameter, the method returns to step 172 to establish the null value for the next command parameter. If there is no next command parameter, the method proceeds to step 184.

A calibration table is generated from the command parameter values at step 184. A calibration table includes signal feature values and command points, and associates a signal feature value with a command point that yields the signal feature value. For example, a calibration table may associate transmit power values and relative phase values and I- and Q-values that yield the transmit power values and relative phase values. A calibration table may be generated for a set of target signal feature values, which may be established according to an interface standard.

A calibration table may generated from one, some, or all of the scanned command parameter values in any suitable manner. According to one embodiment, for each target signal feature value, a command point that substantially yields the signal feature value may be selected according to a selection criterion. The criterion may state, for example, the command point that minimizes an error, such as relative power error, should be selected.

According to another embodiment, a first point for a target signal feature value may be selected by setting one command parameter to its null value and selecting the other command parameter value such that the command point yields a signal feature value closest to the target signal feature value. The next point near the first point may be selected according to a gradient search. The process may be repeated for additional points.

According to another embodiment, the scanned values may be symmetric to unscanned values such that measurements of the unscanned values may be determined from the measurements of the scanned values. For example, the set of command parameter values may be divided into quadrants according to TABLE 1. According to the example, values of one quadrant, for example, Quadrant 1 may be scanned. Measurements of the values of the other quadrants, for example, Quadrants 2 through 4, may be determined from the measurements of the values of Quadrant 1.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a calibration process may be performed on a transmit diversity device to determine calibration data. The calibration data may be used to establish command parameter values that yield signals with specific signal feature values under actual operating conditions. A technical advantage of another embodiment may be that null values of the command parameters are established. The null values may be used to efficiently gather measurements of a signal feature of signals generated according to the command parameter values. A technical advantage of another embodiment may be that calibration data may be efficiently generated from the measurements of the signal feature.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for collecting calibration data, comprising:
   sending a plurality of commands to a transmit diversity device, said commands to cause said transmit diversity device to transmit a respective plurality of signals;
   receiving at a calibration system said plurality of signals from said transmit diversity device, each signal of the plurality of signals transmitted from a channel of a plurality of channels of a transmit diversity device, the plurality of signals generated according to a plurality of command points, a command point comprising a plurality of command parameter values of a plurality of command parameters;
   establishing a null value for each command parameter of the plurality of command parameters to yield a plurality of null values, a null value for a command parameter representing a command parameter value that yields a minimum signal feature value of a signal feature; and
   determining a signal feature value for each command point of the plurality of command points in accordance with the plurality of null values to yield a plurality of signal feature values;
   associating at least one signal feature value of the plurality of signal feature values with a command point that substantially yields the at least one signal feature value; and
   storing a table of said associations of signal feature values with command points in a memory in said calibration system.

2. The method of claim 1, wherein the signal feature further comprises a transmit power of the plurality of signals.

3. The method of claim 1, wherein the plurality of command parameters further comprise:
   an I-branch parameter representing a real weight for weighting an I-branch of the transmit diversity device; and
   a Q-branch parameter representing an imaginary weight for weighting an Q-branch of the transmit diversity device.

4. The method of claim 1, wherein establishing a null value for each command parameter of the plurality of command parameters further comprises:
   performing the following for each command parameter operating as a maintained command parameter:
      maintaining the maintained command parameter at a nominal value of the maintained command parameter;
      varying a scanned command parameter through a plurality of candidate null values;
      measuring the signal feature of the plurality of signals to yield a plurality of null scanning signal feature values; and
      establishing the null value of the scanned command parameter from the plurality of null scanning signal feature values.

5. The method of claim 4, wherein establishing a null value for each command parameter of the plurality of command parameters further comprises:
   performing the following for each command parameter operating as a maintained command parameter:
      maintaining the maintained command parameter at a nominal value of the maintained command parameter;
      varying a scanned command parameter through a plurality of candidate null values starting from a maximum candidate null value;
      measuring the signal feature of the plurality of signals to yield a plurality of null scanning signal feature values; and
      establishing the null value of the scanned command parameter from the plurality of null scanning signal feature values.

6. The method of claim 4, wherein establishing a null value for each command parameter of the plurality of command parameters further comprises:
   performing the following for each command parameter operating as a maintained command parameter:
      maintaining the maintained command parameter at a nominal value of the maintained command parameter;
      varying a scanned command parameter through a plurality of candidate null values according to a gradient search;
      measuring the signal feature of the plurality of signals to yield a plurality of null scanning signal feature values; and
      establishing the null value of the scanned command parameter from the plurality of null scanning signal feature values.

7. The method of claim 1, wherein determining a signal feature value for each command point of the plurality of command points further comprises:
   performing the following for each command parameter operating as a maintained command parameter:
      maintaining the maintained command parameter at a null value of the maintained command parameter;
      varying a scanned command parameter through a plurality of candidate command parameter values; and
      measuring the signal feature of the plurality of signals to yield the plurality of signal feature values.

8. The method of claim 1, wherein determining a signal feature value for each command point of the plurality of command points further comprises:
   varying a scanned command parameter through a first command parameter value subset of a plurality of candidate command parameter values;
   measuring the signal feature of the plurality of signals to yield a first signal feature value subset of the plurality of signal feature values, the first signal feature value subset comprising a signal feature value for each command parameter value of the first command parameter value subset; and
   determining a signal feature value for each command parameter value of a second command parameter value subset of the plurality of candidate command parameter values by interpolation from the first signal feature value subset.

9. The method of claim 1, wherein determining a signal feature value for each command point of the plurality of command points further comprises:
varying a scanned command parameter through a first command parameter value subset of a plurality of candidate command parameter values;
measuring the signal feature of the plurality of signals to yield a first signal feature value subset of the plurality of signal feature values, the first signal feature value subset comprising a signal feature value for each command parameter value of the first command parameter value subset; and
determining a signal feature value for each candidate parameter value of a second command parameter value subset of the plurality of second command parameter values according to a symmetry between the first command parameter value subset and the second command parameter value subset.

10. The method of claim 1, further comprising:
determining from the associations a next signal feature value for a next command point distinct from the plurality of command points; and
associating the next signal feature value with the next command point.

11. A system for collecting calibration data, comprising:
an interface operable to:
send a plurality of commands to a transmit diversity device, said commands to cause said transmit diversity device to transmit a respective plurality of signals; and
receive said plurality of signals, each signal of the plurality of signals transmitted from a channel of a plurality of channels of said transmit diversity device, the plurality of signals generated according to a plurality of command points, a command point comprising a plurality of command parameter values of a plurality of command parameters; and
a transmit diversity tester coupled to the interface and operable to:
establish a null value for each command parameter of the plurality of command parameters to yield a plurality of null values, a null value for a command parameter representing a command parameter value that yields a minimum signal feature value of a signal feature;
determine a signal feature value for each command point of the plurality of command points to yield a plurality of signal feature values by determining the signal feature value for each command point of the plurality of command points in accordance with the plurality of null values;
associate at least one signal feature value of the plurality of signal feature values with a command point that substantially yields the at least one signal feature value; and
store a table of said associations of signal feature values with command points in a memory.

12. The system of claim 11, wherein the signal feature further comprises a transmit power of the plurality of signals.

13. The system of claim 11, wherein the plurality of command parameters further comprise:
an I-branch parameter representing a real weight for weighting an I-branch of the transmit diversity device; and
a Q-branch parameter representing an imaginary weight for weighting an Q-branch of the transmit diversity device.

14. The system of claim 11, the transmit diversity tester further operable to establish a null value for each command parameter of the plurality of command parameters by:
performing the following for each command parameter operating as a maintained command parameter:
maintaining the maintained command parameter at a nominal value of the maintained command parameter;
varying a scanned command parameter through a plurality of candidate null values;
measuring the signal feature of the plurality of signals to yield a plurality of null scanning signal feature values; and
establishing the null value of the scanned command parameter from the plurality of null scanning signal feature values.

15. The system of claim 11, the transmit diversity tester further operable to establish a null value for each command parameter of the plurality of command parameters by:
performing the following for each command parameter operating as a maintained command parameter:
maintaining the maintained command parameter at a nominal value of the maintained command parameter;
varying a scanned command parameter through a plurality of candidate null values starting from a maximum candidate null value;
measuring the signal feature of the plurality of signals to yield a plurality of null scanning signal feature values; and
establishing the null value of the scanned command parameter from the plurality of null scanning signal feature values.

16. The system of claim 11, the transmit diversity tester further operable to establish a null value for each command parameter of the plurality of command parameters by:
performing the following for each command parameter operating as a maintained command parameter:
maintaining the maintained command parameter at a nominal value of the maintained command parameter;
varying a scanned command parameter through a plurality of candidate null values according to a gradient search;
measuring the signal feature of the plurality of signals to yield a plurality of null scanning signal feature values; and
establishing the null value of the scanned command parameter from the plurality of null scanning signal feature values.

17. The system of claim 11, the transmit diversity tester further operable to determine a signal feature value for each command point of the plurality of command points by:
varying a scanned command parameter through a first command parameter value subset of a plurality of candidate command parameter values;
measuring the signal feature of the plurality of signals to yield a first signal feature value subset of the plurality of signal feature values, the first signal feature value subset comprising a signal feature value for each command parameter value of the first command parameter value subset; and
determining a signal feature value for each command parameter value of a second command parameter value subset of the plurality of candidate command parameter values by interpolation from the first signal feature value subset.

18. The system of claim 11, the transmit diversity tester further operable to determine a signal feature value for each command point of the plurality of command points by:
varying a scanned command parameter through a first command parameter value subset of a plurality of candidate command parameter values;
measuring the signal feature of the plurality of signals to yield a first signal feature value subset of the plurality of signal feature values, the first signal feature value subset comprising a signal feature value for each command parameter value of the first command parameter value subset; and
determining a signal feature value for each candidate parameter value of a second command parameter value subset of the plurality of second command parameter values according to a symmetry between the first command parameter value subset and the second command parameter value subset.

19. The system of claim 11, the transmit diversity tester further operable to:
determine from the associations a next signal feature value for a next command point distinct from the plurality of command points; and associate the next signal feature value with the next command point.

20. A system for collecting calibration data, comprising:
an interface operable to:
send a plurality of commands to a transmit diversity device, said commands to cause said transmit diversity device to transmit a respective plurality of signals;
receive said plurality of signals, each signal of the plurality of signals transmitted from a channel of a plurality of channels of said transmit diversity device, the plurality of signals generated according to a plurality of command points, a command point comprising a plurality of command parameter values of a plurality of command parameters; and
a transmit diversity tester coupled to the interface and operable to:
determine a signal feature value for each command point of the plurality of command points to yield a plurality of signal feature values by:
performing the following for each command parameter operating as a maintained command parameter:
maintaining the maintained command parameter at a null value of the maintained command parameter;
varying a scanned command parameter through a plurality of candidate command parameter values; and
measuring the signal feature of the plurality of signals to yield the plurality of signal feature values;
associate at least one signal feature value of the plurality of signal feature values with a command point that substantially yields the at least one signal feature value; and
store a table of said associations of signal feature values with command points in a memory.

21. Non-transitory logic for collecting calibration data, the logic embodied in one or more computer-readable media and when executed operable to:
send a plurality of commands to a transmit diversity device, said commands to cause said transmit diversity device to transmit a respective plurality of signals;
receive said plurality of signals, each signal of the plurality of signals transmitted from a channel of a plurality of channels of a transmit diversity device, the plurality of signals generated according to a plurality of command points, a command point comprising a plurality of command parameter values of a plurality of command parameters;
establish a null value for each command parameter of the plurality of command parameters to yield a plurality of null values, a null value for a command parameter representing a command parameter value that yields a minimum signal feature value of a signal feature; and
determine a signal feature value for each command point of the plurality of command points to yield a plurality of signal feature values by determining the signal feature value for each command point of the plurality of command points in accordance with the plurality of null values;
associate at least one signal feature value of the plurality of signal feature values with a command point that substantially yields the at least one signal feature value; and
store a table of said associations of signal feature values with command points in a memory in said calibration system.

22. The non-transitory logic of claim 21, wherein the signal feature further comprises a transmit power of the plurality of signals.

23. The non-transitory logic of claim 21, wherein the plurality of command parameters further comprise:
an I-branch parameter representing a real weight for weighting an I-branch of the transmit diversity device; and
a Q-branch parameter representing an imaginary weight for weighting an Q-branch of the transmit diversity device.

24. The non-transitory logic of claim 21, further operable to establish a null value for each command parameter of the plurality of command parameters by:
performing the following for each command parameter operating as a maintained command parameter:
maintaining the maintained command parameter at a nominal value of the maintained command parameter;
varying a scanned command parameter through a plurality of candidate null values;
measuring the signal feature of the plurality of signals to yield a plurality of null scanning signal feature values; and
establishing the null value of the scanned command parameter from the plurality of null scanning signal feature values.

25. The non-transitory logic of claim 21, further operable to establish a null value for each command parameter of the plurality of command parameters by:
performing the following for each command parameter operating as a maintained command parameter:
maintaining the maintained command parameter at a nominal value of the maintained command parameter;
varying a scanned command parameter through a plurality of candidate null values starting from a maximum candidate null value;
measuring the signal feature of the plurality of signals to yield a plurality of null scanning signal feature values; and
establishing the null value of the scanned command parameter from the plurality of null scanning signal feature values.

26. The non-transitory logic of claim 21, further operable to establish a null value for each command parameter of the plurality of command parameters by:
  performing the following for each command parameter operating as a maintained command parameter:
    maintaining the maintained command parameter at a nominal value of the maintained command parameter;
    varying a scanned command parameter through a plurality of candidate null values according to a gradient search;
    measuring the signal feature of the plurality of signals to yield a plurality of null scanning signal feature values; and
    establishing the null value of the scanned command parameter from the plurality of null scanning signal feature values.

27. The non-transitory logic of claim 21, further operable to determine a signal feature value for each command point of the plurality of command points by:
  performing the following for each command parameter operating as a maintained command parameter:
    maintaining the maintained command parameter at a null value of the maintained command parameter;
    varying a scanned command parameter through a plurality of candidate command parameter values; and
    measuring the signal feature of the plurality of signals to yield the plurality of signal feature values.

28. The non-transitory logic of claim 21, further operable to determine a signal feature value for each command point of the plurality of command points by:
  varying a scanned command parameter through a first command parameter value subset of a plurality of candidate command parameter values;
  measuring the signal feature of the plurality of signals to yield a first signal feature value subset of the plurality of signal feature values, the first signal feature value subset comprising a signal feature value for each command parameter value of the first command parameter value subset; and
  determining a signal feature value for each command parameter value of a second command parameter value subset of the plurality of candidate command parameter values by interpolation from the first signal feature value subset.

29. The non-transitory logic of claim 21, further operable to determine a signal feature value for each command point of the plurality of command points by:
  varying a scanned command parameter through a first command parameter value subset of a plurality of candidate command parameter values;
  measuring the signal feature of the plurality of signals to yield a first signal feature value subset of the plurality of signal feature values, the first signal feature value subset comprising a signal feature value for each command parameter value of the first command parameter value subset; and
  determining a signal feature value for each candidate parameter value of a second command parameter value subset of the plurality of second command parameter values according to a symmetry between the first command parameter value subset and the second command parameter value subset.

30. The non-transitory logic of claim 21, further operable to:
  determine from the associations a next signal feature value for a next command point distinct from the plurality of command points; and
  associate the next signal feature value with the next command point.

31. A method for collecting calibration data, comprising:
  receiving a plurality of signals, each signal of the plurality of signals transmitted from a channel of a plurality of channels of a transmit diversity device, the plurality of signals generated according to a plurality of command points, a command point comprising a plurality of command parameter values of a plurality of command parameters, the plurality of command parameters comprising:
    an I-branch parameter representing a real weight for weighting an I-branch of the transmit diversity device; and
    a Q-branch parameter representing an imaginary weight for weighting an Q-branch of the transmit diversity device;
  establishing a null value for each command parameter of the plurality of command parameters to yield a plurality of null values, a null value for a command parameter representing a command parameter value that yields a minimum signal feature value of a signal feature establishing a null value for each command parameter of the plurality of command parameters further comprising:
    performing the following for each command parameter operating as a maintained command parameter:
      maintaining the maintained command parameter at a nominal value of the maintained command parameter;
      varying a scanned command parameter through a plurality of candidate null values;
      measuring the signal feature of the plurality of signals to yield a plurality of null scanning signal feature values; and
      establishing the null value of the scanned command parameter from the plurality of null scanning signal feature values;
    performing the following for each command parameter operating as a maintained command parameter:
      maintaining the maintained command parameter at a nominal value of the maintained command parameter;
      varying a scanned command parameter through a plurality of candidate null values starting from a maximum candidate null value;
      measuring the signal feature of the plurality of signals to yield a plurality of null scanning signal feature values; and
      establishing the null value of the scanned command parameter from the plurality of null scanning signal feature values; and
    performing the following for each command parameter operating as a maintained command parameter:
      maintaining the maintained command parameter at a nominal value of the maintained command parameter;
      varying a scanned command parameter through a plurality of candidate null values according to a gradient search;
      measuring the signal feature of the plurality of signals to yield a plurality of null scanning signal feature values; and establishing the null value of the scanned command parameter from the plurality of null scanning signal feature values;

determining a signal feature value for each command point of the plurality of command points in accordance with the plurality of null values to yield a plurality of signal feature values, the signal feature comprising a transmit power of the plurality of signals, determining a signal feature value for each command point of the plurality of command points further comprising:

performing the following for each command parameter operating as a maintained command parameter:

maintaining the maintained command parameter at a null value of the maintained command parameter;

varying a scanned command parameter through a plurality of candidate command parameter values; and measuring the signal feature of the plurality of signals to yield the plurality of signal feature values;

determining a signal feature value for each command point of the plurality of command points further comprising:

varying a scanned command parameter through a first command parameter value subset of a plurality of candidate command parameter values;

measuring the signal feature of the plurality of signals to yield a first signal feature value subset of the plurality of signal feature values, the first signal feature value subset comprising a signal feature value for each command parameter value of the first command parameter value subset; and determining a signal feature value for each command parameter value of a second command parameter value subset of the plurality of candidate command parameter values by interpolation from the first signal feature value subset; and determining a signal feature value for each command point of the plurality of command points further comprising:

varying a scanned command parameter through a first command parameter value subset of a plurality of candidate command parameter values;

measuring the signal feature of the plurality of signals to yield a first signal feature value subset of the plurality of signal feature values, the first signal feature value subset comprising a signal feature value for each command parameter value of the first command parameter value subset; and determining a signal feature value for each candidate parameter value of a second command parameter value subset of the plurality of second command parameter values according to a symmetry between the first command parameter value subset and the second command parameter value subset;

associating at least one signal feature value of the plurality of signal feature values with a command point that substantially yields the at least one signal feature value;

determining from the associations a next signal feature value for a next command point distinct from the plurality of command points; and associating the next signal feature value with the next command point.

\* \* \* \* \*